UNITED STATES PATENT OFFICE.

NATHAN SULZBERGER, OF NEW YORK, N. Y.

SALTS OF AROMATIC HYDROXYL AMINS.

1,390,260.

Specification of Letters Patent.   Patented Sept. 6, 1921.

No Drawing.   Application filed December 18, 1918. Serial No. 267,409.

*To all whom it may concern:*

Be it known that I, NATHAN SULZBERGER, a citizen of the United States, residing at Hotel Netherland, New York, in the county of New York, State of New York, have invented certain new and useful Improvements in Salts of Aromatic Hydroxyl Amins; and I do hereby declare the following to be a full, clear, and exact description of the invention, such as will enable others skilled in the art to which it appertains to make and use the same.

This invention relates to the new and useful products obtained as the result of the interaction of an aromatic hydroxyl-amin with an organic acid. More particularly the invention relates to the salt obtained when an aromatic hydroxyl-amin is treated with oxalic acid. If, for instance, phenyl-hydroxyl-amin is treated with oxalic acid, an oxalate is obtained which is of particular utility in a photographic developer. The new products, according to this invention, however, are not limited to oxalates or to the phenyl-hydroxyl-amin oxalate; in its broader aspect the invention includes salts of the homologues of phenyl-hydroxyl-amin, or of other aromatic hydroxyl-amins, such as naphthyl-hydroxyl-amin, etc.

I have found that when a relatively concentrated solution of phenyl-hydroxyl-amin in water is treated with a solution of oxalic acid (say, about 10%) there is produced almost instantly a crystalline precipitate which is of a stable character, and which is also not very soluble in water. Under proper conditions a relatively pure precipitate can be obtained merely by filtering and washing, but a less pure product, when obtained, can of course be further purified by re-crystallization. The resulting product I consider to be the oxalate (*i. e.*, a salt of an organic acid) of the phenyl-hydroxyl-amin. It is stable in the air and can be kept for long periods of time.

The solution of phenyl-hydroxyl-amin may be produced in any suitable manner. The solutions may, for example, be used in which the hydroxyl-amin is itself directly produced, in the first instance, and without preliminary isolation thereof. Instead of combining the phenyl-hydroxyl-amin with oxalic acid, it can be combined with other organic acids, but I consider that such organic acids as oxalic which precipitate the hydroxyl-amin from its solutions are of particular value. In so far as I am aware not only the oxalate of phenyl-hydroxyl-amin, but also salts with other organic acid are in themselves novel products, and I accordingly claim these new products.

The phenyl-hydroxyl-amin oxalate is of particular utility in photography as a developer. The developing solution is prepared by dissolving in the order given in 100 ozs. of water the following:—

| | |
|---|---|
| Sodium sulfite (dry) | 5¼ ounces |
| Hydro quinone | 1 " |
| Phenyl-hydroxyl-amin oxalate | ½ " |
| Sodium carbonate (anhydrous) | 10 " |
| Potassium bromid (crystalline) | 6 grains |

In using this solution it can be diluted with water to the desired extent and the paper to be developed then treated therewith in a manner such as is customary in the employment of developing solutions.

For developing films I have found the following formula of advantage:

| | |
|---|---|
| Water | 10 ounces |
| Sodium sulfite (dry) | 20 grains |
| Hydro quinone | 40 " |
| Phenyl-hydroxyl-amin oxalate (as above described) | 20 " |
| Sodium carbonate (anhydrous) | 600 " |
| Potassium bromid (crystalline) | 4 " |

In using this developer it can be diluted with water to the desired extent, and then used for developing films in much the usual manner, but with added advantage to the developing process and to the result produced.

I do not claim herein the photographic developers which are herein described, but these form the subject of a divisional application, Serial No. 491,296 filed August 10, 1921.

The solid salts obtained by the interaction of the aromatic hydroxyl-amins and the organic acids are relatively stable. They can be kept for considerable periods of time and may be used in a dry state. Where they are used in a photographic developer they can be combined with other dry ingredients of the developer and the composite developer then added to water or to other solutions for use. The developer may thus be put up in tablet form, etc.

It should, of course, be understood that the invention covers the salts of the aromatic hydroxyl-amins *per se* in solid or dissolved form, and whether used alone or combined with other solid or liquid ingredients.

I claim:

1. As a new product, a salt of an aromatic hydroxyl-amin with an organic acid.

2. As a new product, a salt of phenyl-hydroxyl-amin with an organic acid.

3. As a new product, the compound resulting from the combination of oxalic acid and an aromatic hydroxyl-amin.

4. As a new product, the compound resulting from the reaction of a solution of oxalic acid with a solution of phenyl-hydroxyl-amin, the same being in its dry state a stable crystalline product.

In testimony whereof I affix my signature.

NATHAN SULZBERGER.